US012044990B2

(12) United States Patent
Watatani et al.

(10) Patent No.: US 12,044,990 B2
(45) Date of Patent: Jul. 23, 2024

(54) FIXING DEVICE AND IMAGE FORMING APPARATUS CAPABLE OF SUPPRESSING DEFORMATION OF FIXING BELT AND EXCESSIVE ADHESION OF LUBRICANT

(71) Applicant: KYOCERA Document Solutions Inc., Osaka (JP)

(72) Inventors: Tomohiro Watatani, Osaka (JP); Masakazu Uehara, Osaka (JP); Hironori Takahashi, Osaka (JP); Shota Onishi, Osaka (JP); Yuhiro Sakai, Osaka (JP); Takuya Kawasumi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/191,784

(22) Filed: Mar. 28, 2023

(65) Prior Publication Data

US 2023/0314987 A1 Oct. 5, 2023

(30) Foreign Application Priority Data

Mar. 29, 2022 (JP) ................................ 2022-052916
Oct. 5, 2022 (JP) ................................ 2022-160914

(51) Int. Cl.
*G03G 15/20* (2006.01)

(52) U.S. Cl.
CPC ..... *G03G 15/2025* (2013.01); *G03G 15/2064* (2013.01)

(58) Field of Classification Search
USPC .......................................................... 399/325
See application file for complete search history.

(56) References Cited

U.S. PATENT DOCUMENTS

2018/0011434 A1* 1/2018 Adachi .............. G03G 15/2025
2020/0379386 A1* 12/2020 Watatani ............ G03G 15/2064
2021/0041812 A1* 2/2021 Mimbu ................ D03D 13/002
2021/0382425 A1* 12/2021 Nakamoto ......... G03G 15/2053

FOREIGN PATENT DOCUMENTS

JP 2018005047 A 1/2018

* cited by examiner

*Primary Examiner* — Quana Grainger
(74) *Attorney, Agent, or Firm* — Alleman Hall & Tuttle LLP

(57) ABSTRACT

A fixing device includes a pressure member, and a holder. The pressure member forms a pressure area between the pressure member and a fixing belt. The holder is provided inside the fixing belt, has a sliding surface in contact with an inner peripheral surface of the fixing belt via a lubricant, and holds a heater for heating the fixing belt. The holder includes a plurality of slits and a blocking portion. The plurality of slits are arranged in an axial direction on the sliding surface upstream of the pressure area in a passing direction of a medium and guide movement of the lubricant from upstream to downstream in a rotational direction of the fixing belt. The blocking portion restricts an outflow of the lubricant from each of the slits and restricts a fall of the fixing belt into each of the slits.

10 Claims, 16 Drawing Sheets

FIXING DEVICE AND IMAGE FORMING APPARATUS CAPABLE OF SUPPRESSING DEFORMATION OF FIXING BELT AND EXCESSIVE ADHESION OF LUBRICANT

INCORPORATION BY REFERENCE

This application is based upon and claims the benefit of priority from the corresponding Japanese Patent Application No. 2022-052916 filed on Mar. 29, 2022, and Japanese Patent Application No. 2022-160914 filed on Oct. 5, 2022, the entire contents of which are incorporated herein by reference.

BACKGROUND

The present disclosure relates to a fixing device that fixes a toner image on a medium and an image forming apparatus.

There is known a fixing device including a fixing belt and a pressure roller that is brought into contact with the fixing belt to form a nip portion. A nip forming member is disposed inside the fixing belt, and a lubricant adheres between an inner peripheral surface of the fixing belt and a sliding surface of the nip forming member. The sliding surface of the nip forming member is provided with a plurality of inclined grooves to transfer the lubricant toward the center in the axial direction (width direction). The downstream end of each inclined groove in the rotational direction of the fixing belt is formed to be continuous with the sliding surface of the nip forming member without a step between the downstream end and the sliding surface.

SUMMARY

A fixing device of the present disclosure includes a fixing belt, a pressure member, and a holder. The fixing belt is formed in a flexible cylindrical shape and heats a toner image on a medium while rotating around an axis. The pressure member forms a pressure area between the pressure member and the fixing belt while rotating around an axis, and pressurizes toner on the medium passing through the pressure area. The holder is provided inside the fixing belt, has a sliding surface in contact with an inner peripheral surface of the fixing belt via a lubricant, and holds a heater for heating the fixing belt. The holder includes a plurality of slits and a blocking portion. The plurality of slits are arranged in an axial direction on the sliding surface upstream of the pressure area in a passing direction of the medium and guide movement of the lubricant from upstream to downstream in a rotational direction of the fixing belt. The blocking portion restricts an outflow of the lubricant from each of the slits and restricts a fall of the fixing belt into each of the slits.

An image forming apparatus according to the present disclosure includes any of the fixing devices described above.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
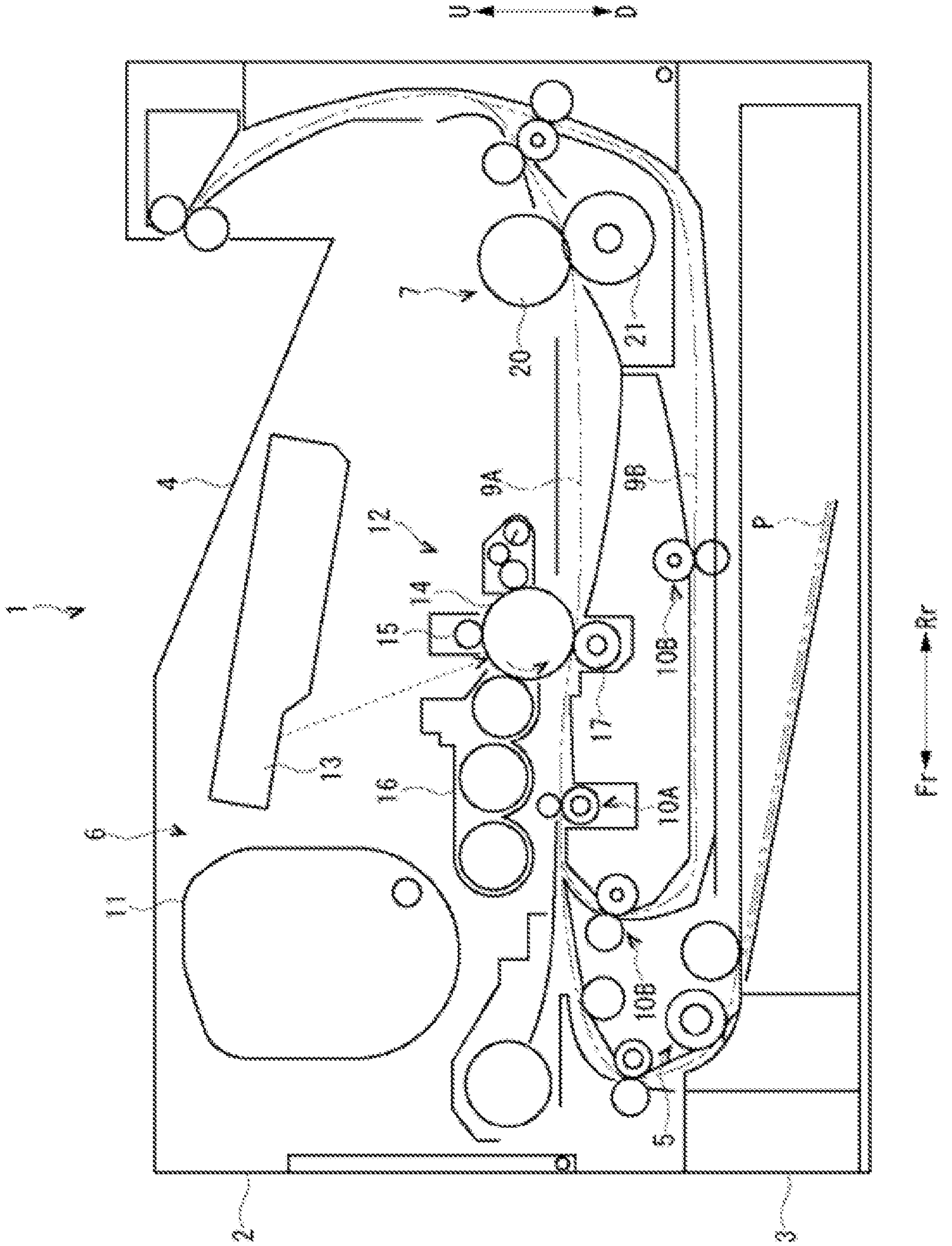
FIG. 1 is a schematic diagram (side view) showing an internal structure of an image forming apparatus according to an embodiment of the present disclosure.

Hereinafter, embodiments of the present disclosure will be described with reference to the accompanying drawings. It is noted that Fr, Rr, L, R, U, and D shown in the drawings indicate front, rear, left, right, up, and down. In addition, the front-rear direction (passing direction), the left-right direction (axial direction), and the up-down direction are orthogonal to each other. Although terms indicating directions and positions are used herein, such terms are used for convenience of explanation and do not limit the technical scope of the present disclosure. Further, the terms “upstream” and “downstream” and similar terms refer to the “upstream” and “downstream” in the passing direction (conveying direction) of a sheet P and similar concepts. It is noted that, in the drawings, the dimensions, angles, etc. of the members are not exact, but are schematic for illustrative purposes.

An image forming apparatus 1 according to an embodiment will be described with reference to FIG. 1. FIG. 1 is a schematic diagram (side view) showing the image forming apparatus 1.

The image forming apparatus 1 is an electrophotographic printer. The image forming apparatus 1 includes an apparatus main body 2, which constitutes a substantially rectangular parallelepiped exterior. In a lower portion of the apparatus main body 2, for example, a sheet feed cassette 3 for housing sheets P (media) is detachably provided. A sheet discharge tray 4 is provided on an upper surface of the apparatus main body 2. It is noted that the sheet P as an example of a medium is not limited to a paper sheet, and may be a resin sheet or the like.

The image forming apparatus 1 includes a sheet feed device 5, an image forming device 6, and a fixing device 7. The sheet feed device 5 is provided at an upstream end of a conveying path 9A extending from the sheet feed cassette 3 to the sheet discharge tray 4, and feeds the sheets P housed in the sheet feed cassette 3 one by one to the conveying path 9A. The image forming device 6 is provided in the middle of the conveying path 9A, and forms a toner image on the sheet P being conveyed. The fixing device 7 is provided at a downstream portion of the conveying path 9A, and thermally fixes the toner image on the sheet P.

A registration roller pair 10A is provided on the conveying path 9A to temporarily block the sheet P being conveyed, and correct the skew (skew correction) of the sheet P. Below the conveying path 9A, there is provided a reverse conveying path 9B which branches off from a downstream portion of the conveying path 9A and joins an upstream portion of the conveying path 9A. The reverse conveying path 9B is provided with a plurality of conveying roller pairs 10B for conveying the sheet P.

The image forming device 6 includes a toner container 11, a drum unit 12, and a laser scanning unit 13. The toner container 11 is disposed in a front upper portion of the apparatus main body 2 and stores, for example, black toner (developer). The drum unit 12 includes a photoconductor drum 14, a charging device 15, a developing device 16, and a transfer roller 17. The photoconductor drum 14 is formed in a substantially circular cylindrical shape and is driven to rotate around an axis by a motor (not shown). The charging device 15, the developing device 16, and the transfer roller 17 are disposed around the photoconductor drum 14 in image forming processing order. The transfer roller 17 contacts the photoconductor drum 14 from below to form a transfer nip. The laser scanning unit 13 is provided above the photoconductor drum 14, and emits scanning light toward the surface of the photoconductor drum 14.

[Image Forming Process]

An operation of the image forming apparatus 1 will be described. A control device (not shown) that performs overall control of the image forming apparatus 1 executes an image forming process as follows based on image data input from an external terminal.

The charging device 15 charges the surface of the photoconductor drum 14, and the laser scanning unit 13 emits scanning light based on the image data to form an electrostatic latent image on the photoconductor drum 14. The developing device 16 develops a toner image on the photoconductor drum 14 using toner supplied from the toner container 11. The sheet feed device 5 feeds the sheets P from the sheet feed cassette 3 one by one to the conveying path 9A. The sheet P is conveyed along the conveying path 9A, is skew-corrected by the registration roller pair 10A, and enters the transfer nip. The transfer roller 17 transfers the toner image on the photoconductor drum 14 onto the surface of the sheet P passing the transfer nip. The fixing device 7 thermally fixes the toner image on the sheet P. In the case of single-sided printing, the sheet P that has passed through the fixing device 7 is discharged to the sheet discharge tray 4.

In the case of double-sided printing, the sheet P that has passed through the fixing device 7 is switched back at the downstream end of the conveying path 9A and sent to the reverse conveying path 9B. The sheet P is conveyed by the conveying roller pairs 10B, returned from the reverse conveying path 9B to the conveying path 9A again, and sent to the transfer nip after being skew-corrected by the registration roller pair 10A. Thereafter, the toner image is transferred to the sheet P and thermally fixed, and the double-sided printed sheet P is discharged to the sheet discharge tray 4.

First Embodiment: Fixing Device

Figure 2:
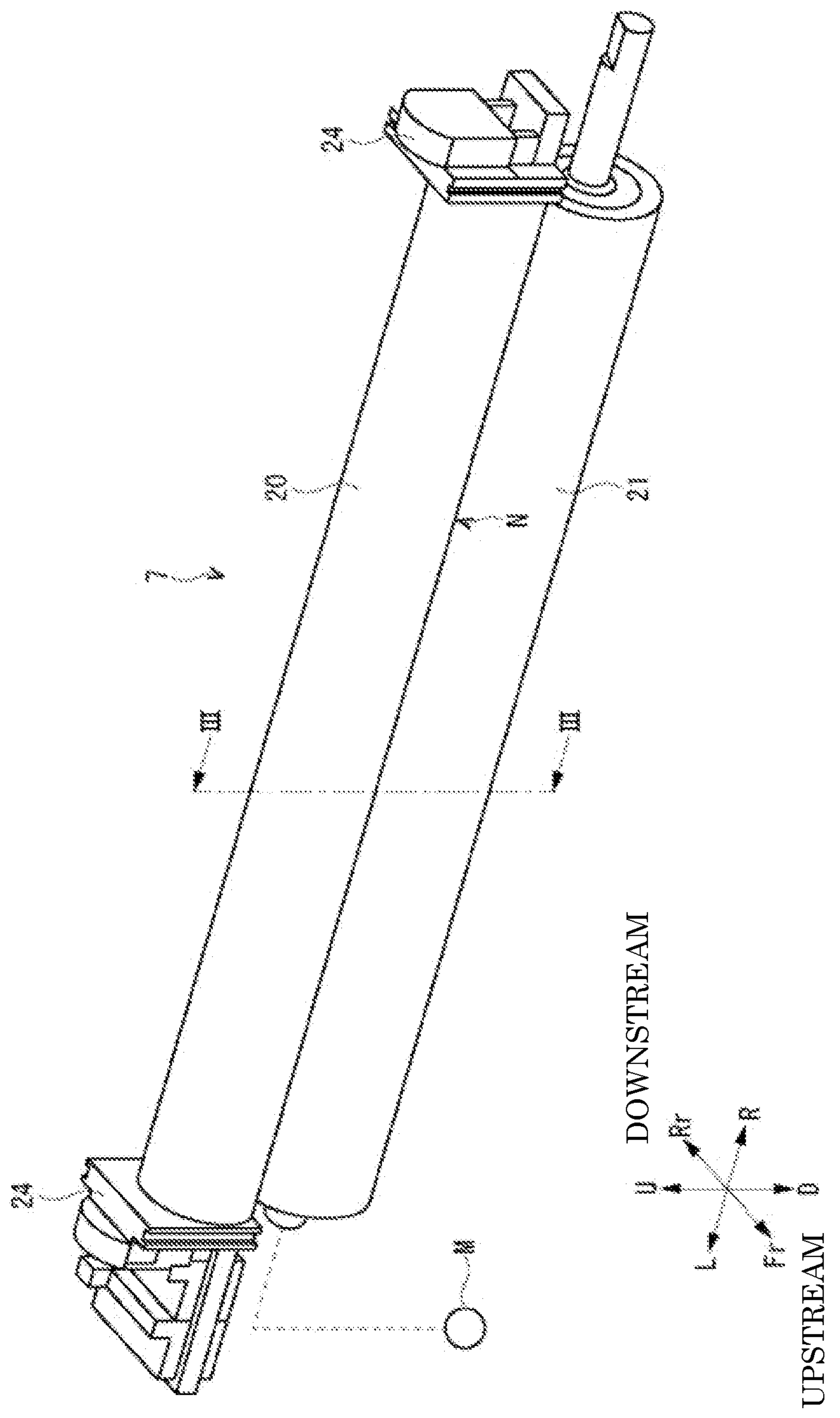
FIG. 2 is a perspective view showing a fixing device according to a first embodiment of the present disclosure.
Figure 3:
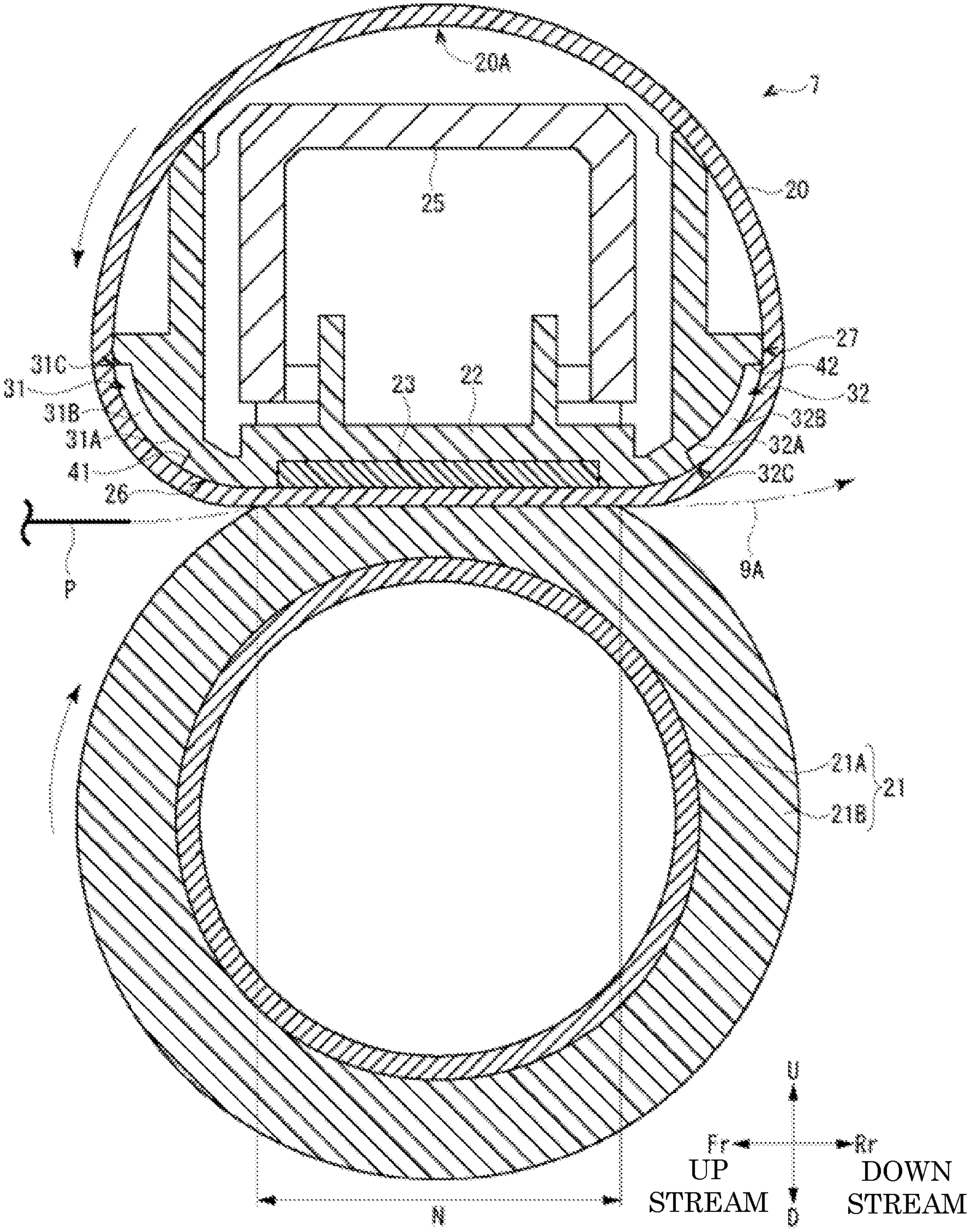
FIG. 3 is a cross-sectional view taken along line III-III in FIG. 2.

The fixing device 7 according to the first embodiment will be described with reference to FIG. 2 and FIG. 3. FIG. 2 is a perspective view showing the fixing device 7. FIG. 3 is a cross-sectional view taken along line III-III in FIG. 2.

The fixing device 7 includes a fixing belt 20, a pressure roller 21, a heater holder 22, and a heater 23. The fixing belt 20 and the pressure roller 21 are supported by a frame (not shown), and the frame is fixed to the apparatus main body 2. The heater holder 22 is provided inside the fixing belt 20, and the heater 23 is held by the heater holder 22 (see FIG. 3).

<Fixing Belt>

The fixing belt 20 is an endless belt formed in a substantially circular cylindrical shape elongated in the left-right direction (axial direction). The fixing belt 20 is made of, for example, a synthetic resin having heat resistance and flexibility (elasticity). A pair of holding members 24 (see FIG. 2) are inserted into the left and right ends of the fixing belt 20 to hold the fixing belt 20 in a substantially circular cylindrical shape. The pair of holding members 24 guides both ends of the fixing belt 20 in the axial direction so as to be rotatable around the axis. It is noted that the fixing belt 20 is supported by the frame via the pair of holding members 24 (not shown).

<Pressure Roller>

The pressure roller 21, which is an example of a pressure member, is formed in a substantially circular cylindrical shape elongated in the left-right direction. The pressure roller 21 has a metal core 21A and an elastic layer 21B such as a silicon sponge stacked on the outer peripheral surface of the core 21A (see FIG. 3). A drive motor M is connected to the left end of the core 21A via a gear train (not shown) (see FIG. 2). The pressure roller 21 contacts the fixing belt 20 from below and forms a pressure area N between the pressure roller 21 and the fixing belt 20. The pressure area N refers to an area from an upstream position where the pressure is 0 Pa via a position where the pressure acts to a downstream position where the pressure becomes 0 Pa again.

<Heater Holder>

As shown in FIG. 3, the heater holder 22 (holder) is supported by a support member 25 inside the fixing belt 20. The support member 25 is made of a metal material such as stainless steel and is formed in a substantially quadrilateral cylindrical shape elongated in the left-right direction (axial direction). The support member 25 is provided between the pair of holding members 24. The heater holder 22 is fixed to a lower portion of the support member 25. The heater holder 22 is made of, for example, a synthetic resin having heat resistance and wear resistance, and is formed in a substantially semi-circular cylindrical shape elongated in the left-right direction. The heater holder 22 is in contact with an inner peripheral surface 20A on the lower side (the pressure area N side) of the fixing belt 20.

<Heater>

The heater 23 is formed in a substantially rectangular plate shape elongated in the left-right direction, and is fixed to the lower surface of the heater holder 22. The heater 23 has a heating resistor (not shown) which is stacked on a substrate and generates heat when energized. In the heater 23, the heating resistor is in contact with the inner peripheral surface 20A of the fixing belt 20 at a position corresponding to the pressure area N.

It is noted that the frame supporting the fixing belt 20 and the like is provided with a temperature sensor (not shown) for detecting the surface temperature of the fixing belt 20. The drive motor M, the heater 23, the temperature sensor, and the like are electrically connected to the control device of the image forming apparatus 1 via various drive circuits (not shown) and are appropriately controlled.

[Action of Fixing Device]

Here, the action (fixing process) of the fixing device 7 will be described. The pressure roller 21 rotates by receiving the driving force of the drive motor M, and the fixing belt 20 rotates following the pressure roller 21 (see the arrows in FIG. 3). The heater 23 heats the fixing belt 20. The control device receives a detection signal from the temperature sensor and starts the execution of the image forming process described above while controlling the heater 23 so as to maintain a preset temperature.

The sheet P on which the toner image has been transferred enters the pressure area N. The fixing belt 20 heats the toner (toner image) on the sheet P passing through the pressure area N, while rotating around the axis. The pressure roller 21 presses the toner on the sheet P passing through the pressure area N, while rotating around the axis. The toner image is thereby fixed on the sheet P. Then, the sheet P on which the toner image has been fixed is discharged to the sheet discharge tray 4.

[Details of Heater Holder]

As shown in FIG. 3, the heater holder 22 has sliding surfaces 26, 27 in contact with the inner peripheral surface 20A of the fixing belt 20 upstream and downstream of a portion holding the heater 23 (position corresponding to the pressure area N). It is noted that, herein, for convenience of explanation, the sliding surface 26 upstream of the pressure area N is referred to as a "first sliding surface 26", the sliding surface 27 downstream of the pressure area N is referred to as a "second sliding surface 27", and in the explanation common to the first sliding surface 26 and the second sliding surface 27, these are each simply referred to as a "sliding surface 26, 27".

A lubricant (not shown) is applied to the inner peripheral surface 20A of the fixing belt 20, and the sliding surfaces 26, 27 of the heater holder 22 are in contact with the inner peripheral surface 20A of the fixing belt 20 via the lubricant. The lubricant is grease or the like having viscosity and fluidity, and reduces the frictional resistance between the fixing belt 20 and the heater holder 22. The lubricant moves as the fixing belt 20 rotates, but it is known to move toward both axially outward directions in an area where the inner peripheral surface 20A of the fixing belt 20 is not in contact with the sliding surfaces 26, 27. When the lubricant leaks from both ends in the axial direction of the fixing belt 20 and the amount of the lubricant decreases due to repeated fixing processes, the frictional resistance between the fixing belt 20 and the heater holder 22 increases, which may hinder the smooth rotation of the fixing belt 20.

Figure 4:
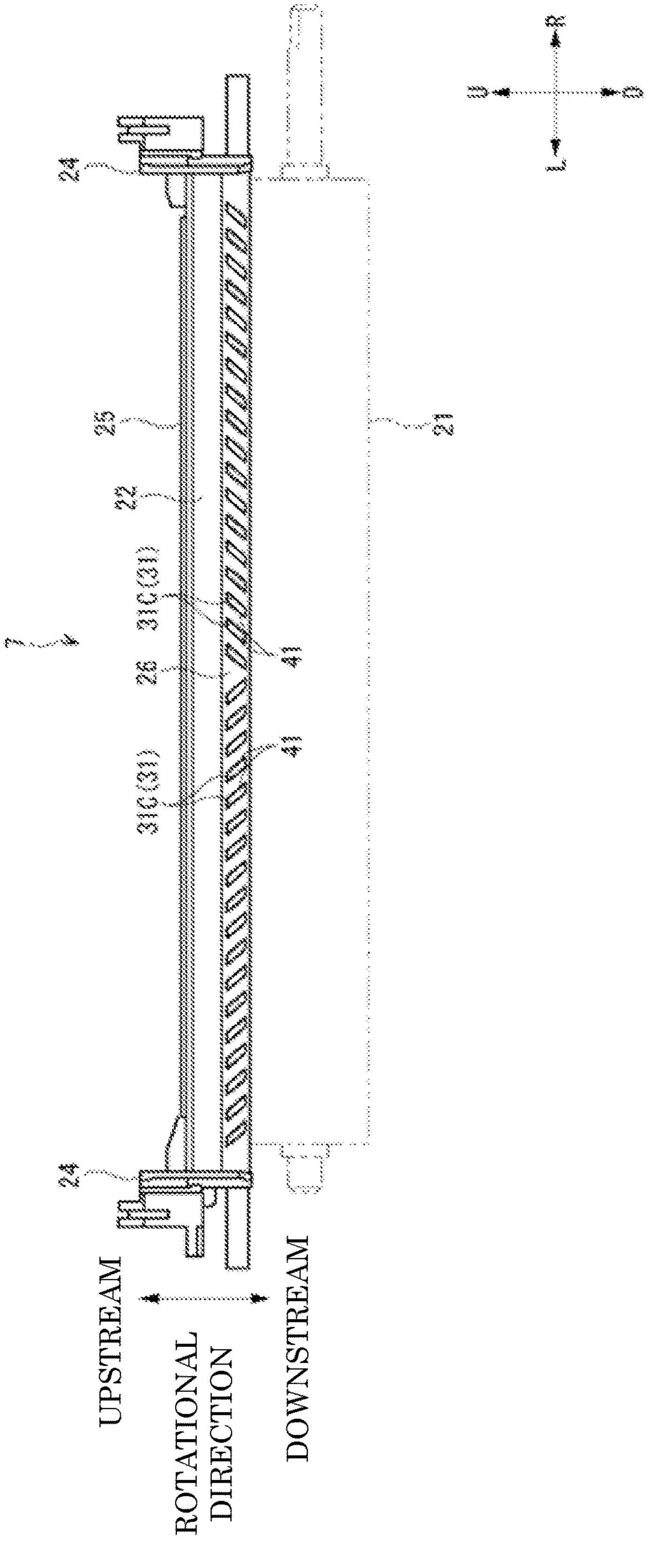
FIG. 4 is a front view showing the fixing device according to the first embodiment of the present disclosure.
Figure 5:
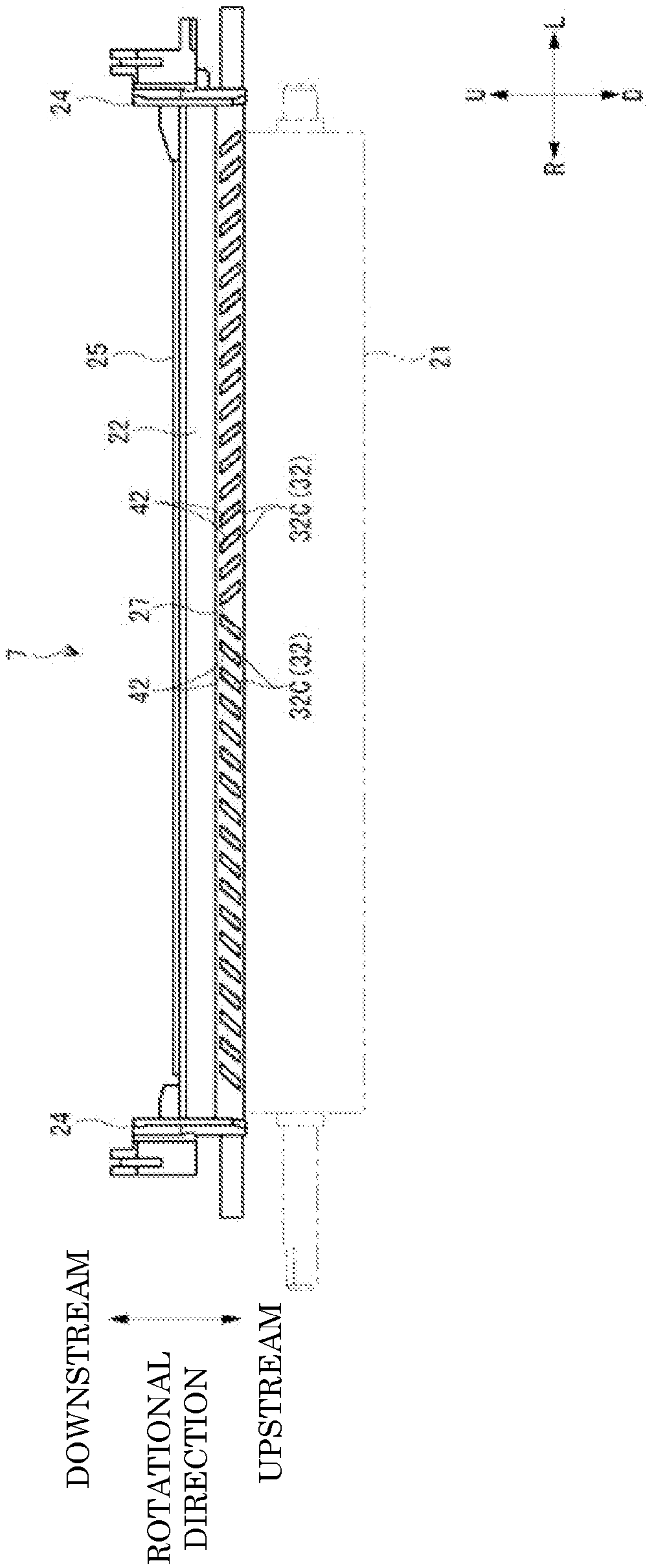
FIG. 5 is a rear view showing the fixing device according to the first embodiment of the present disclosure.

Therefore, the fixing device 7 according to the present embodiment is provided with a structure for suppressing leakage of the lubricant applied to the inner peripheral surface 20A of the fixing belt 20. Hereinafter, the structure for suppressing leakage of the lubricant will be described with reference to FIGS. 3 to 5. FIG. 4 is a front view showing the fixing device 7. FIG. 5 is a rear view showing the fixing device 7. It is noted that the fixing belt 20 is omitted in FIG. 4 and FIG. 5.

<Slits>

The heater holder 22 includes a plurality of first slits 31 arranged in the left-right direction (axial direction) on the first sliding surface 26 upstream of the pressure area N (see FIG. 4), and a plurality of second slits 32 arranged in the axial direction on the second sliding surface 27 downstream of the pressure area N (see FIG. 5). The plurality of first slits 31 and the plurality of second slits 32 each guide the movement of the lubricant from upstream to downstream in the rotational direction of the fixing belt 20. It is noted that, for simplicity of explanation, this specification will mainly describe one first slit 31 and one second slit 32, and will refer to each of the first slit 31 and the second slit 32 simply as a "slit 31, 32" in descriptions common to the first slit 31 and the second slit 32. In addition, as mentioned at the beginning of this specification, when simply referring to "upstream/downstream", it refers to the passing direction (conveying direction) of the sheet P and is distinguished from "upstream/downstream" of the rotational direction of the fixing belt 20.

As shown in FIG. 4 and FIG. 5, the slit 31, 32 is a groove extending linearly along the rotational direction of the fixing belt 20. More precisely, the slit 31, 32 is inclined toward the center in the axial direction from upstream to downstream of the rotational direction of the fixing belt 20. The inclination angles (absolute values) of the plurality of slits 31, 32 are all the same, and the plurality of slits 31, 32 are arranged symmetrically about their center in the left-right direction. It is noted that the intervals between the plurality of slits 31, 32 inclined in the same direction (the distances between the centroids) are substantially equal, but are not limited thereto, and may be irregular (not shown). In addition, the plurality of slits 31, 32 have the same width in the axial direction, but may have different widths (not shown).

(First Slit)

As shown in FIG. 3 and FIG. 4, the first slit 31 has a bottom surface 31A and a peripheral wall surface 31B, and is recessed to form an annular opening edge 31C on the first sliding surface 26. The bottom surface 31A and the opening edge 31C have a substantially parallelogrammatic outer shape, and the peripheral wall surface 31B is formed in a substantially quadrilateral cylindrical shape so as to connect the peripheral edge of the bottom surface 31A and the opening edge 31C. That is, the peripheral wall surface 31B forms a step between the bottom surface 31A and the first sliding surface 26. The step is preferably be, for example, about 0.5 to 2.0 mm high. The wall surface of the peripheral wall surface 31B of the first slits 31 located on the downstream side in the rotational direction of the fixing belt 20 serves as a blocking portion 41 that restricts the outflow of the lubricant from the first slit 31. Although the details will be described later, the blocking portion 41 also has a function of restricting the fall of the fixing belt 20 into the first slit 31. The blocking portion 41 is located upstream of the most upstream end of the pressure area N (portion holding the heater 23), and the first sliding surface 26 is also formed between the blocking portion 41 and the most upstream end of the pressure area N.

(Second Slit)

As shown in FIG. 3 and FIG. 5, the second slit 32 is shaped like the first slit 31 turned upside down. The second slit 32 has a bottom surface 32A and a peripheral wall surface 32B, and is recessed to form an annular opening edge 32C on the second sliding surface 27. The wall surface of the peripheral wall surface 32B located on the downstream side of the rotational direction serves as a blocking portion 42.

[Action of Slits]

The lubricant adhering to the inner peripheral surface 20A of the fixing belt 20 moves downstream in the rotational direction as the fixing belt 20 rotates so as to lubricate the fixing belt 20 (inner peripheral surface 20A) sliding against the first sliding surface 26. The lubricant enters the first slit 31 and moves toward the center in the axial direction along the first slit 31.

As the fixing belt 20 rotates, the lubricant lubricates the fixing belt 20 sliding against the heater 23, and as the fixing belt 20 passes through the pressure area N, the lubricant lubricates the fixing belt 20 sliding against the second sliding surface 27. The lubricant enters the second slit 32 and moves toward the center in the axial direction along the second slit 32.

As described above, since the slit 31, 32 is inclined toward the center in the axial direction from upstream to downstream in the rotational direction of the fixing belt 20, the lubricant can be moved toward the center in the axial direction of the heater holder 22. This suppresses the leakage of the lubricant from both outer ends in the axial direction of the fixing belt 20.

By the way, if the slit 31, 32 does not have the blocking portion 41, 42 (step) and the downstream side of the slit 31, 32 in the rotational direction is smoothly continuous with the sliding surface 26, 27, substantially all of the lubricant that has flown into the slit 31, 32 may flows out, and the amount of lubricant adhering to the inner peripheral surface 20A of the fixing belt 20 may become excessive. In addition, in the above-assumed case, the fixing belt 20 may fall into a downstream portion of the slit 31, 32 in the rotational direction and be deformed in a wavy manner in the axial direction. The lubricant may not uniformly adhere to the inner peripheral surface 20A of the fixing belt 20 deformed in a wavy manner, and the sliding resistance (friction) between the fixing belt 20 and the sliding surface 26, 27 may increase. In addition, if the fixing belt 20 is deformed in a wavy manner, the pressure in the pressure area N may not be uniform in the axial direction, and image defects such as streaky gloss unevenness may occur in the fixed image. Further, when the fixing belt 20 deformed in a wavy manner rotates, a force that moves the fixing belt 20 in the axial direction may act, and an end of the fixing belt 20 may be brought into contact with the holding member 24 and damaged.

In order to solve the above-described problems, in the fixing device 7 according to the first embodiment, a blocking portion 41, 42 for restricting the movement of the lubricant is formed on the downstream side of the slit 31, 32 in the rotational direction. Some of the lubricant moving along the slit 31, 32 flows out over the blocking portion 41, 42, but the rest of the lubricant is blocked by the blocking portion 41, 42 and remains in the slit 31, 32. This limits the amount of lubricant that flows out of the slit 31, 32, and suppresses excessive adhesion of the lubricant to the inner peripheral surface 20A of the fixing belt 20.

In addition, in the fixing device 7 according to the first embodiment, the slit 31, 32 is a recess having an annular opening edge 31C, 32C on the sliding surface 26, 27, and the fixing belt 20 is supported by the annular opening edge 31C, 32C. According to this configuration, the fixing belt 20 can be prevented from falling into the slit 31, 32 and being deformed in a wavy manner in the axial direction. This allows the lubricant to substantially uniformly adhere to the smooth inner peripheral surface 20A of the fixing belt 20. As a result, an increase in the sliding resistance (friction) between the fixing belt 20 and the heater holder 22 can be suppressed, and smooth rotation of the fixing belt 20 can be ensured. In addition, since the wavy deformation of the fixing belt 20 is suppressed upstream of the pressure area N, the pressure in the pressure area N can be made substantially uniform in the axial direction. This suppresses image defects such as gloss unevenness. Further, since the force that moves the fixing belt 20 in the axial direction is hardly exerted when the fixing belt 20 rotates, the contact of the end of the fixing belt 20 with the holding member 24 is suppressed, and the damage of the end portion of the fixing belt 20 can also be suppressed.

Second Embodiment: Fixing Device

Figure 6:
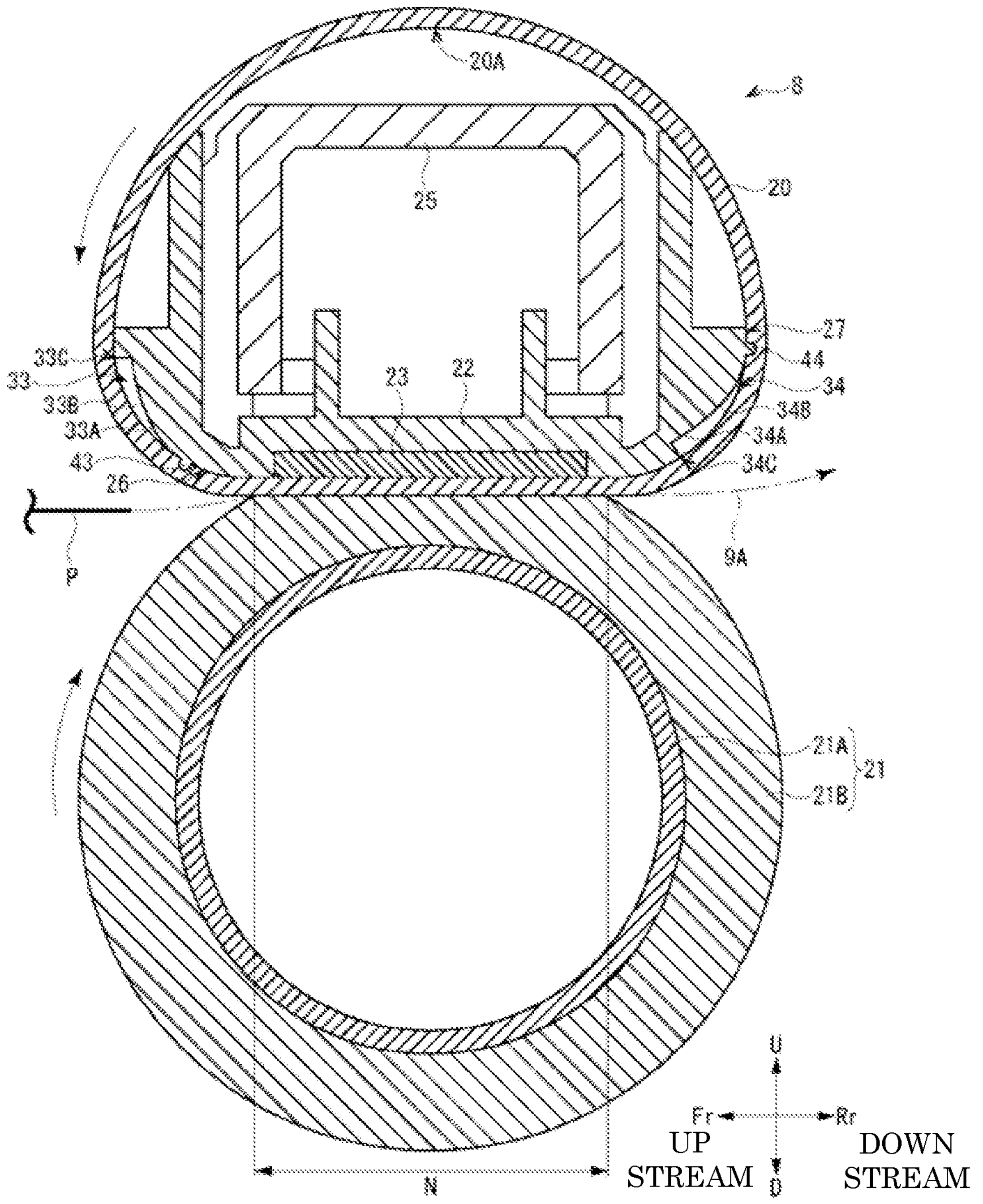
FIG. 6 is a cross-sectional view showing a fixing device according to a second embodiment of the present disclosure.
Figure 7:
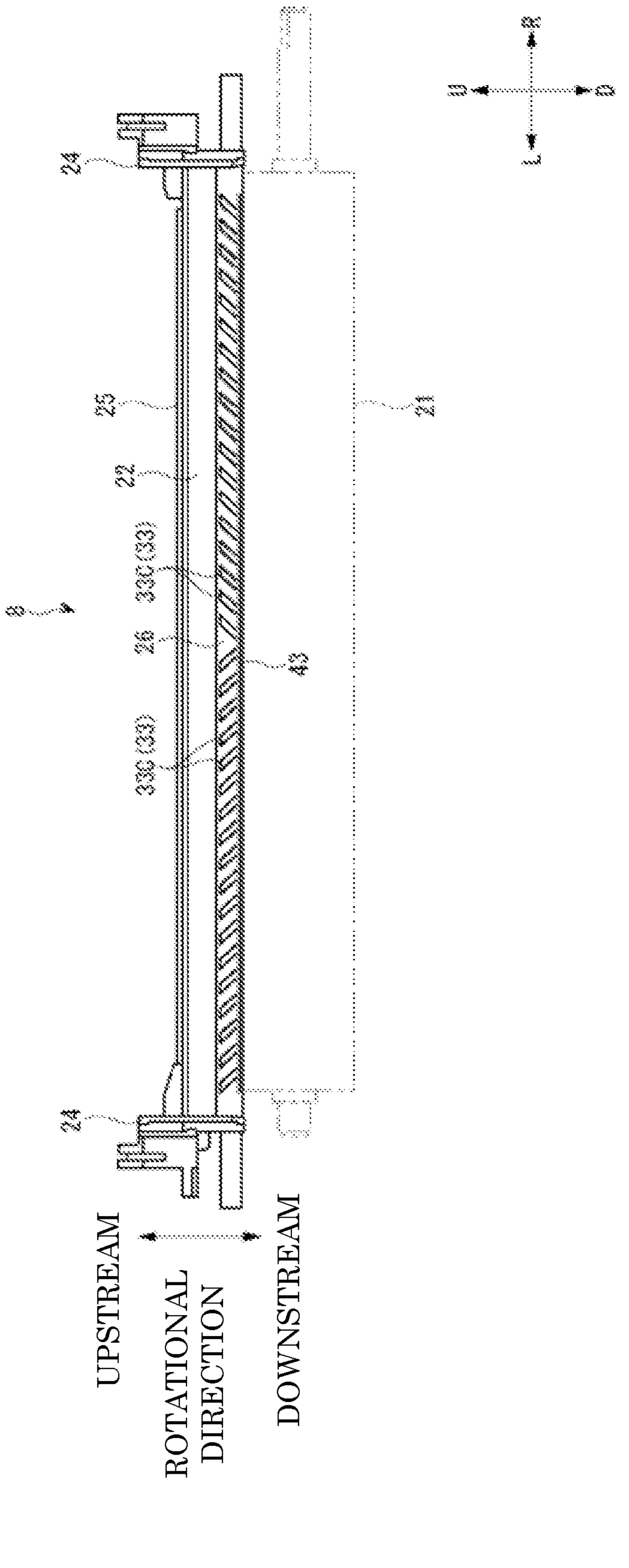
FIG. 7 is a front view showing the fixing device according to the second embodiment of the present disclosure.
Figure 8:
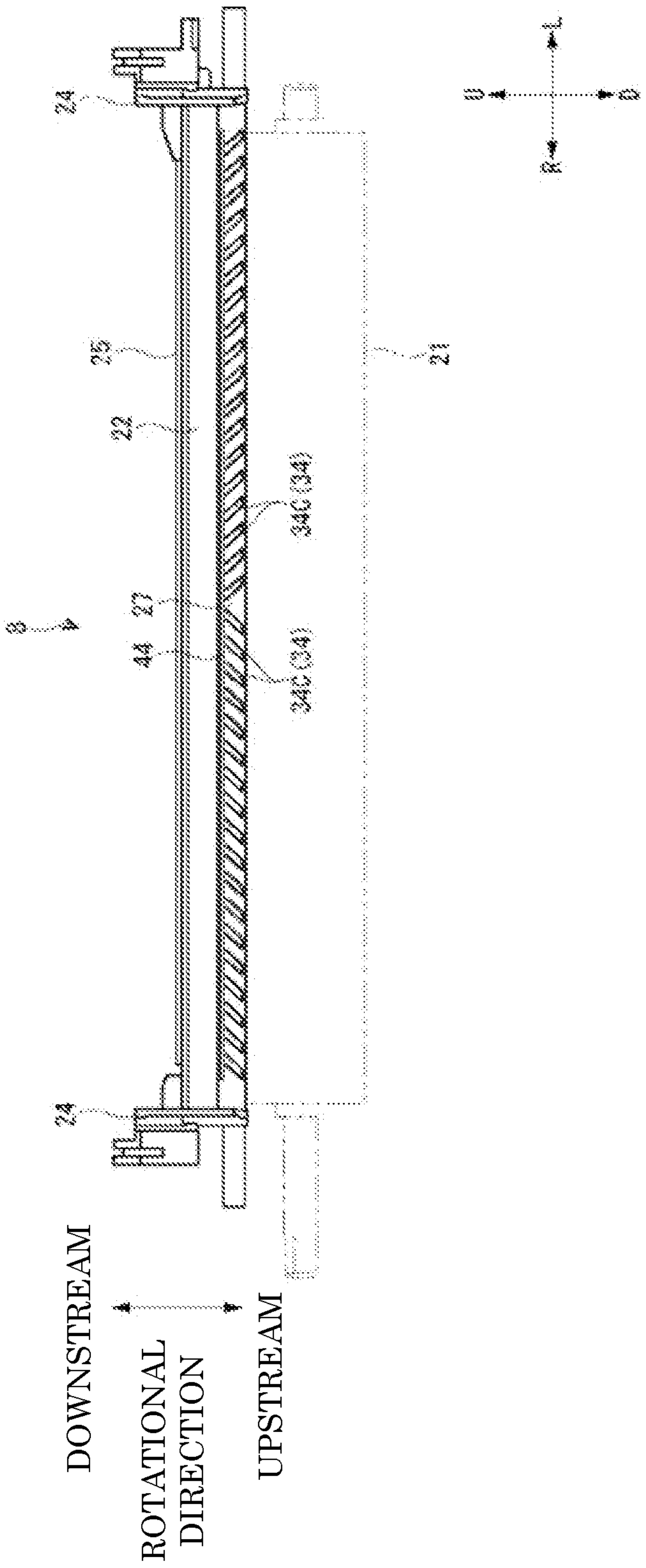
FIG. 8 is a rear view showing the fixing device according to the second embodiment of the present disclosure.

Next, a fixing device 8 according to a second embodiment will be described with reference to FIG. 6 to FIG. 8. FIG. 6 is a cross-sectional view showing the fixing device 8. FIG. 7 is a front view showing the fixing device 8. FIG. 8 is a rear view showing the fixing device 8. It is noted that the fixing belt 20 is omitted in FIG. 7 and FIG. 8. In addition, in the following description, the same reference numerals are assigned to the same components as those of the fixing device 7 according to the first embodiment, and the description of the same components will be omitted.

The fixing device 8 according to the second embodiment differs from the fixing device 7 according to the first embodiment in the slits 33, 34 and the blocking portions 43, 44 formed in the sliding surfaces 26, 27.

The heater holder 22 includes a plurality of first slits 33 arranged in the left-right direction (axial direction) on the first sliding surface 26 upstream of the pressure area N (see FIG. 7), and a plurality of second slits 34 arranged in the axial direction on the second sliding surface 27 downstream of the pressure area N (see FIG. 8). It is noted that, for simplicity of explanation, this specification will mainly describe one first slit 33 and one second slit 34, and will refer to each of the first slit 33 and the second slit 34 simply as a "slit 33, 34" in descriptions common to the first slit 31 and the second slit 32.

As shown in FIG. 6 and FIG. 7, the first slit 33 has a bottom surface 33A and a peripheral wall surface 33B, and is recessed to form a U-shaped opening edge 33C on the first sliding surface 26. The peripheral wall surface 33B does not have a wall surface on the downstream side in the rotational direction of the fixing belt 20, and the downstream end of the bottom surface 33A is formed to be continuous with the first sliding surface 26 without a step. It is noted that the second slit 34 (the bottom surface 34A, the peripheral wall surface 34B, and the opening edge 34C) is shaped like the first slit 33 turned upside down (see FIG. 6 and FIG. 8), a detailed description thereof will be omitted.

As shown in FIG. 6 to FIG. 8, a blocking portion 43, 44 is a rib protruding from the sliding surface 26, 27 of the heater holder 22 downstream of the slits 33, 34 in the rotational direction of the fixing belt 20. The blocking portion 43, 44 linearly extends in the axial direction at a position close to the slits 33, 34. Preferably, the upper end of the blocking portion 43, 44 is rounded, and the height of the blocking portion 43, 44 is, for example, about 0.5 to 2.0 mm.

[Action of Slits]

The lubricant adhering to the inner peripheral surface 20A of the fixing belt 20 moves downstream in the rotational direction as the fixing belt 20 rotates, and moves toward the center in the axial direction along the slit 33, 34. Most of the lubricant that has flown into the slit 33, 34 flows out. Some of the lubricant that flows out of the slit 33, 34 flows over the blocking portion 43, 44 and moves downstream in the rotational direction, but the rest of the lubricant is blocked by the blocking portion 43, 44.

The fixing device 8 according to the second embodiment described above can limit the amount of lubricant that flows out of the slit 33, 34, and suppress excessive adhesion of the lubricant to the inner peripheral surface 20A of the fixing belt 20. In addition, since the fixing belt 20 is supported by the blocking portion 43, 44, the fixing belt 20 can be prevented from falling into the slits 33, 34 and being deformed in a wavy manner in the axial direction. This makes it possible to obtain the same effects as those of the fixing device 7 according to the first embodiment, such as smooth rotation of the fixing belt 20, suppression of image defects, and suppression of damage to the end of the fixing belt 20.

It is noted that, in the fixing device 8 according to the second embodiment, the downstream end of the slit 33, 34 is formed to be continuous with the sliding surface 26, 27, but the present disclosure is not limited to this. In the fixing device 8 according to the second embodiment, the slit 33, 34 of the fixing device 7 according to the first embodiment may be used instead of the slit 31, 32 (not shown). That is, the sliding surface 26, 27 may be provided with the blocking portion 41, 42 provided in the slit 31, 32 and the rib-like blocking portion 43, 44 (not shown). Providing the two types of blocking portions 41 to 44 in this manner makes it possible to more effectively suppress excessive adhesion of the lubricant to the inner peripheral surface 20A of the fixing belt 20 and waving of the fixing belt 20.

[Modification]

Figure 9:
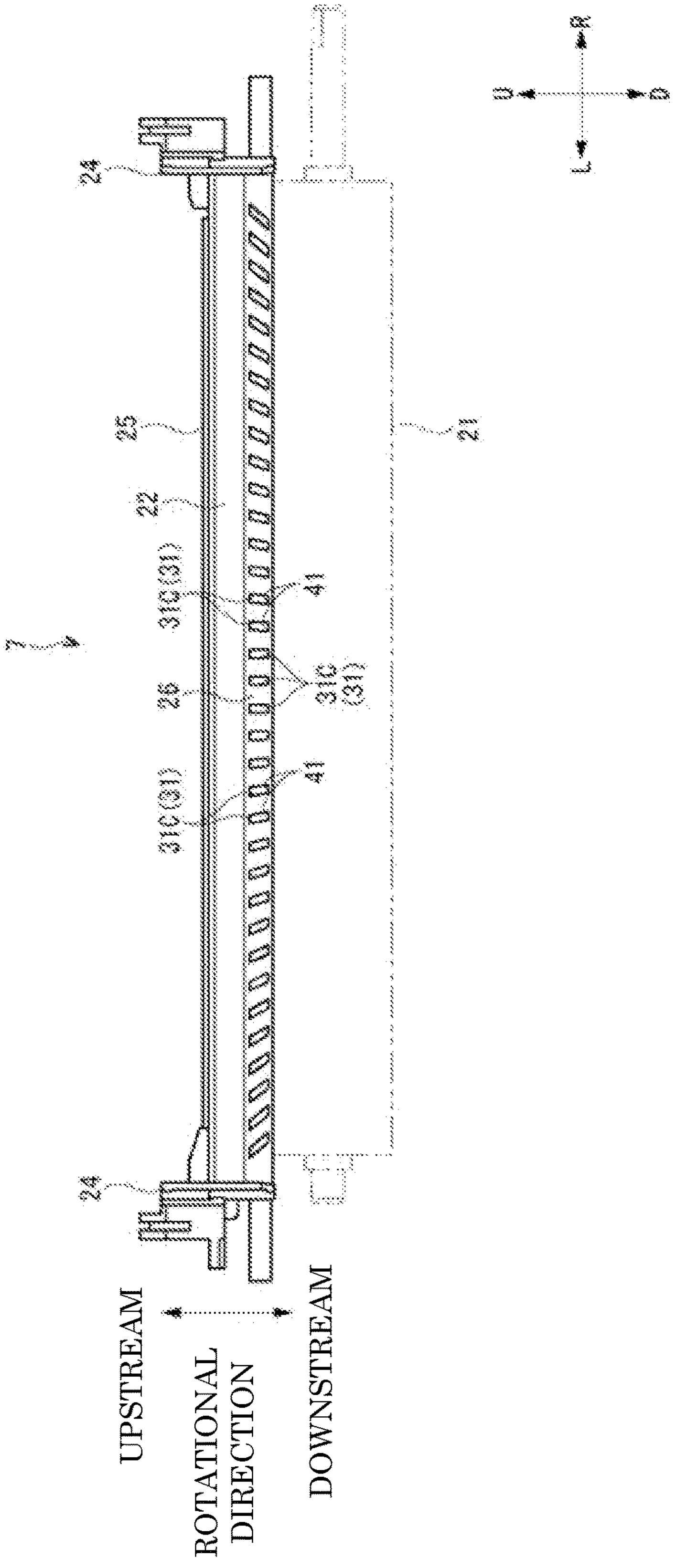
FIG. 9 is a front view showing the fixing device according to a modification of the first embodiment of the present disclosure.
Figure 10:
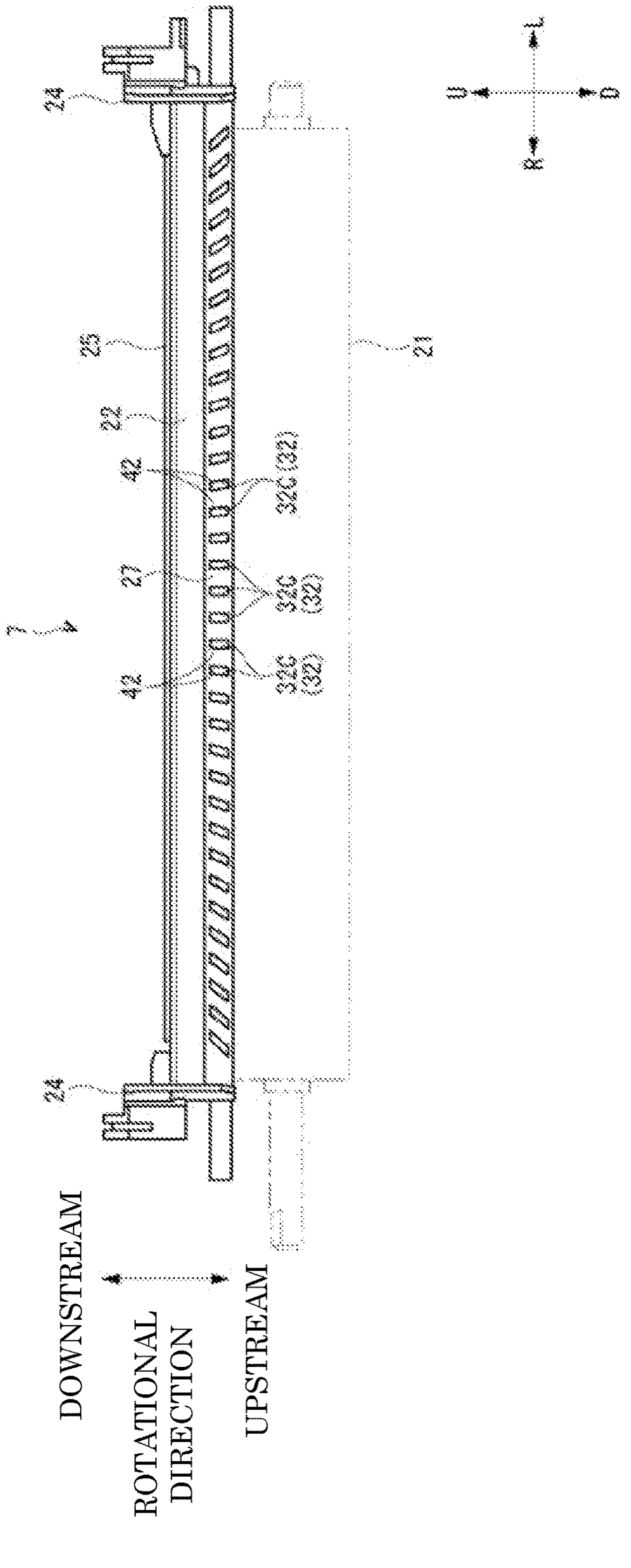
FIG. 10 is a rear view showing the fixing device according to the modification of the first embodiment of the present disclosure.

It is noted that, in the fixing devices 7 and 8 according to the first and second embodiments, since the plurality of slits 31 to 34 are inclined at the same angle, depending on the inclination angle, the lubricant may gather too much at the center in the axial direction. Therefore, as a fixing device 7 according to the modification of the first embodiment, as shown in FIG. 9 and FIG. 10, three slits 31, 32 near the center in the axial direction may be formed in parallel with the rotational direction of the fixing belt 20, and the slits 31, 32 other than the three slits 31, 32 may be inclined toward the center in the axial direction from upstream to downstream in the rotational direction of the fixing belt 20. In addition, the inclination angle of the plurality of slits 31, 32 may gradually increase from the center toward both outer sides in the axial direction. According to this configuration, the more outward in the axial direction the slits 31 and 32 are, the more the direction of movement of the lubricant can be directed toward the center. This suppresses the leakage of the lubricant from both ends of the fixing belt 20 in the axial direction while preventing the lubricant from gathering too much at the center in the axial direction. As a result, the lubricant can be substantially uniformly adhered to the inner peripheral surface 20A of the fixing belt 20.

It is noted that, in the case of the slits 31, 32 according to the modification described above, three slits 31, 32 near the center in the axial direction are formed in parallel with the rotational direction, but the present disclosure is not limited to this, and it is sufficient that at least one slit 31, 32 is formed in parallel with the rotational direction. In addition, although the slits 31, 32 according to the above-described modification are formed in both the upstream and downstream sliding surfaces 26, 27, the present disclosure is not limited to this. The slits 31, 32 according to the modification may be formed on either one of the upstream and downstream sliding surfaces 26, 27, and slits 31, 32 inclined at the same angle may be formed on the other one (not shown). In addition, the features of the slits 31, 32 according to the above-described modification may be applied to the slits 33, 34 of the fixing device 8 according to the second embodiment (not shown).

[Other Modification]

In order to heat and press the toner on the sheet P, the pressure area N and the sliding surfaces 26, 27 are formed longer in the left-right direction (axial direction) than the width (left-right direction dimension) of the sheet P. Therefore, the fixing belt 20 has a sheet passing area (not shown) that contacts the sheet P, and a pair of non-sheet passing areas (not shown) that do not contact the sheet P on both outer sides of the sheet passing area in the axial direction. In addition, the sliding surface 26, 27 that contacts the inner peripheral surface 20A of the fixing belt 20 has a facing area 26A, 27A corresponding to the paper passing area and positioned to face the paper P with the fixing belt 20 interposed therebetween, and a pair of non-facing areas 26B, 27B corresponding to the pair of non-paper passing areas and provided both outer sides of the facing area 26A, 27A in the axial direction not to face the paper P with the fixing belt 20 interposed therebetween. In the non-sheet passing areas (non-facing areas 26B, 27B), since the lubricant tends to move toward both outer sides in the axial direction, it is preferable to direct the flow of the lubricant toward the center in the axial direction. Therefore, for example, a fixing device 7 according to another modification of the first embodiment has a configuration for suppressing the leakage of the lubricant to both outer sides in the axial direction in addition to the features of the fixing device 7 according to the modification described above.

Figure 11:
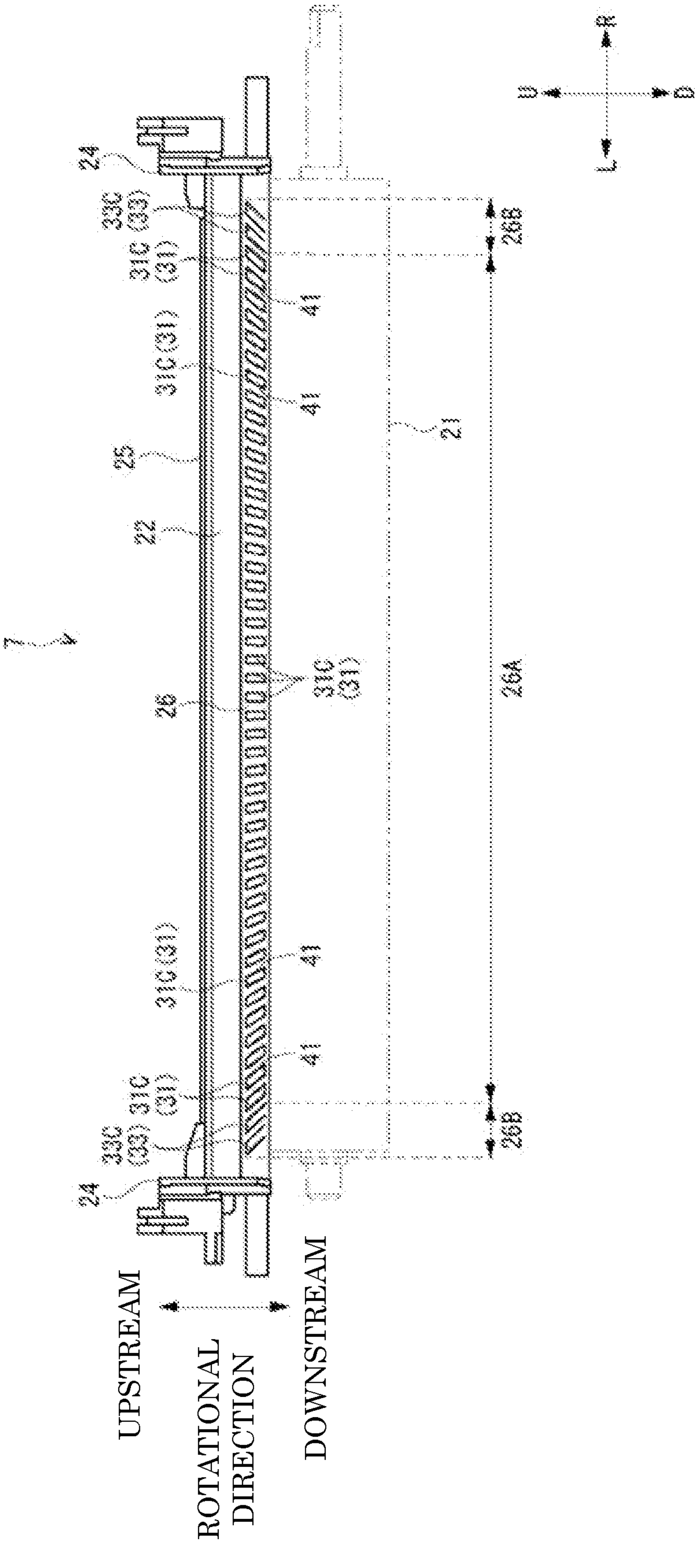
FIG. 11 is a front view showing the fixing device according to another modification of the first embodiment of the present disclosure.
Figure 12:
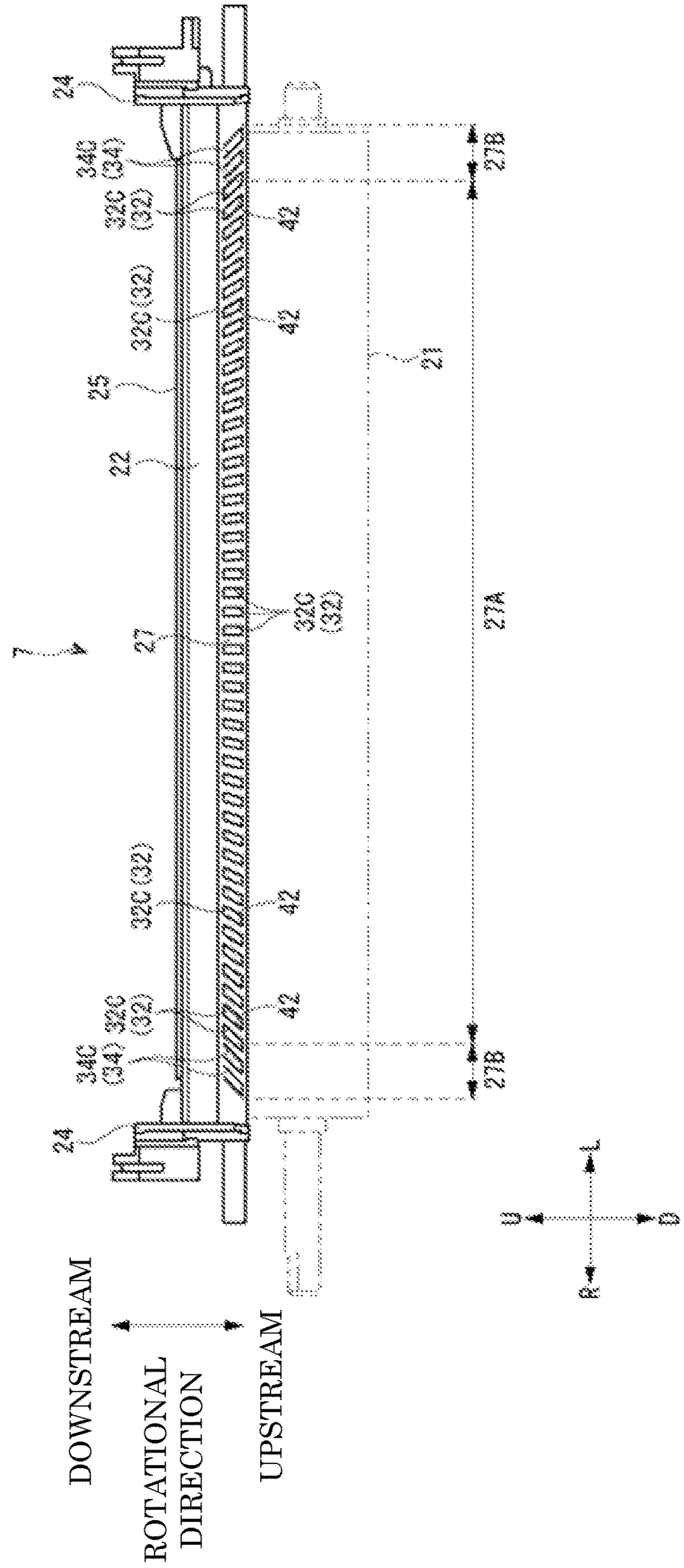
FIG. 12 is a rear view showing the fixing device according to the other modification of the first embodiment of the present disclosure.
Figure 13:
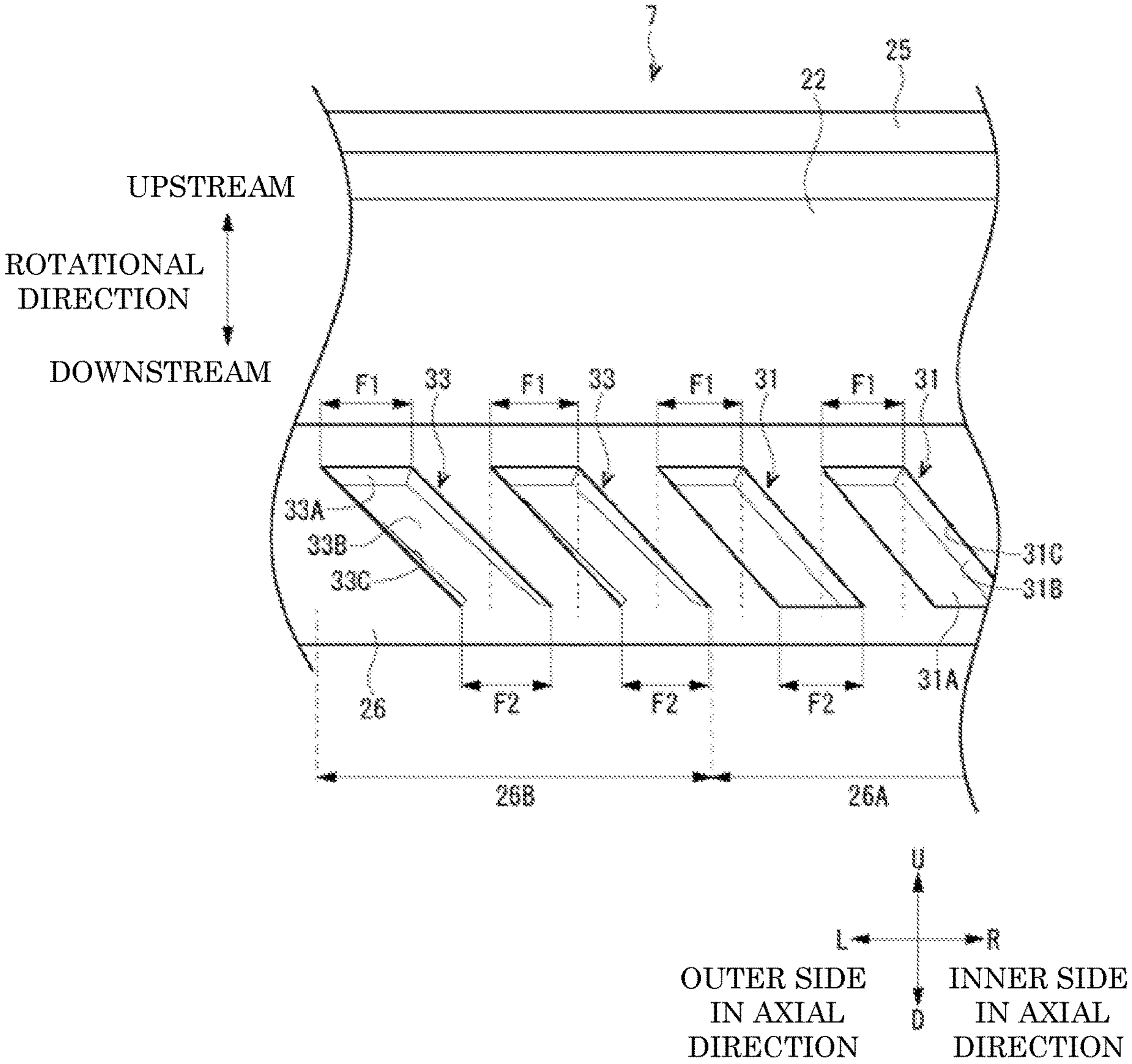
FIG. 13 is an enlarged front view showing a portion of a first sliding surface of the fixing device according to the other modification of the first embodiment of the present disclosure.
Figure 14:
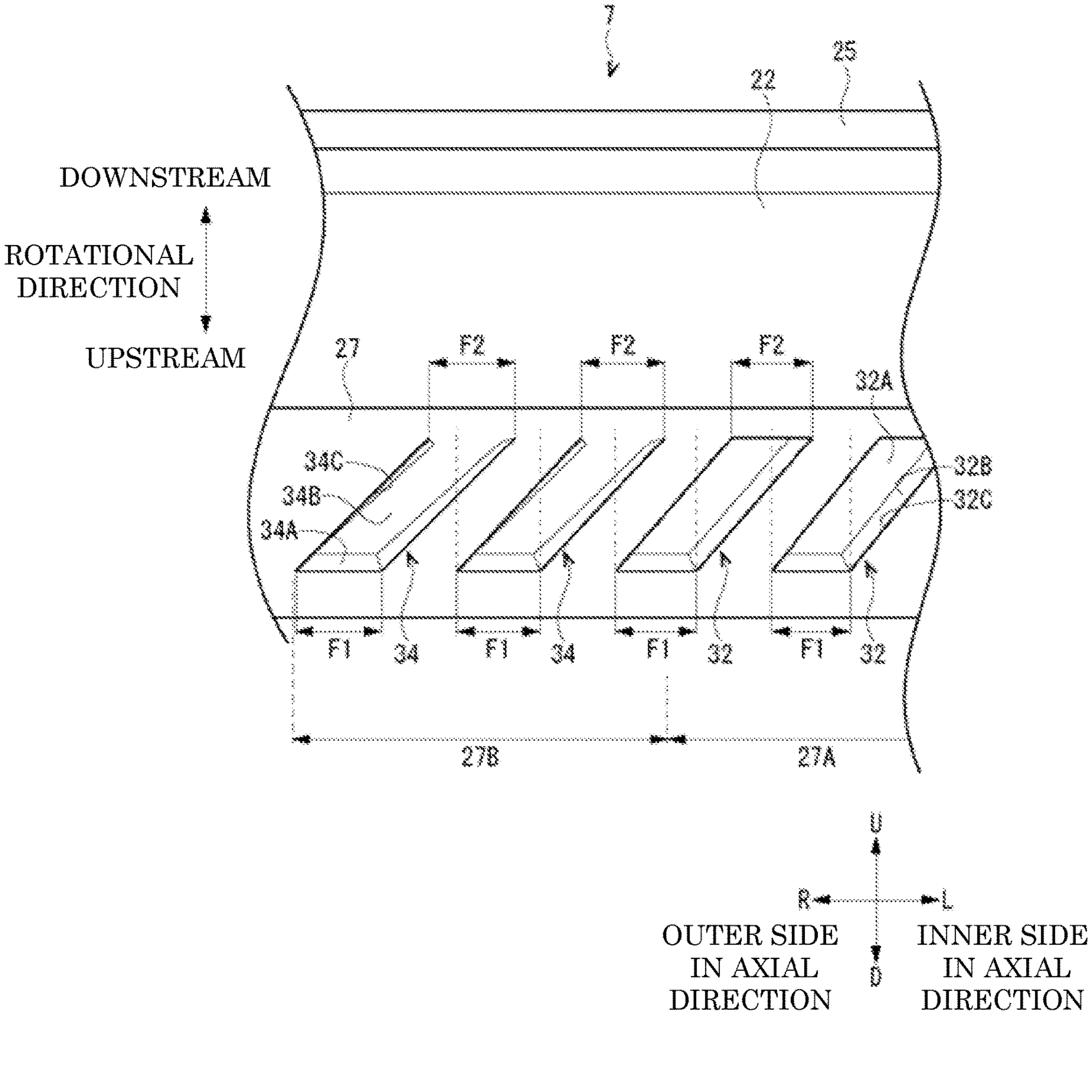
FIG. 14 is an enlarged rear view showing a portion of a second sliding surface of the fixing device according to the other modification of the first embodiment of the present disclosure.

The fixing device 7 according to the other modification will be described with reference to FIG. 11 to FIG. 14. FIG. 11 is a front view showing the fixing device 7. FIG. 12 is a rear view showing the fixing device 7. FIG. 13 is an enlarged front view showing a portion of the first sliding surface 26 of the fixing device 7. FIG. 14 is an enlarged rear view showing a portion of the second sliding surface 27 of the fixing device 7.

As shown in FIG. 11 and FIG. 12, in the fixing device 7 according to the other modification, the blocking portions 41, 42 are formed only in the facing area 26A, 27A and not in the non-facing areas 26B, 27B. Specifically, a plurality of slits 31, 32 having the blocking portions 41, 42 are formed side by side in the facing area 26A, 27A of the sliding surface 26, 27. On the other hand, two slits 33, 34 without the blocking portions 41, 42 are formed side by side in each of the non-facing areas 26B, 27B of the sliding surface 26, 27. It is noted that, two slits 33, 34 are formed in each of the non-facing areas 26B, 27B in FIG. 11 and FIG. 12, but the configuration is not limited to this, and it is sufficient that at least one slit 33, 34 is formed. In addition, it is sufficient that two or more slits 31, 32 are formed in the facing area 26A, 27A.

As shown in FIG. 13 and FIG. 14, the two slits 33,34 formed in each non-facing area 26B, 27B and several (for example, five to six (see FIG. 11 and FIG. 12)) slits 31, 32 formed on the outer sides in the axial direction in the facing area 26A, 27A are inclined so that each outflow portion F2 overlaps the inflow portion F1 of the other slit 31 to 34 adjacent on the inner side in the axial direction when viewed from the rotational direction of the fixing belt 20 (see also the broken lines shown in FIG. 13 and FIG. 14). Here, in the slit 31 to 34, the "inflow portion F1" is a portion (upstream end) that allows the lubricant to flow in from upstream in the rotational direction of the fixing belt 20, and the "outflow portion F2" is a portion (downstream end) that allows the lubricant to flow out downstream in the rotational direction of the fixing belt 20.

More specifically, in each non-facing area 26B, 27B, the outflow portion F2 of the slit 33, 34 located at the outermost end in the axial direction overlaps the inflow portion F1 of the slit 33, 34 adjacent on the inner side in the axial direction when viewed from the rotational direction. In addition, the outflow portion F2 of the slit 33, 34 located on the inner side in the axial direction in the non-facing area 26B, 27B overlaps the inflow portion F1 of the slit 31, 32 located at the outermost end in the axial direction in the facing area 26A, 27A adjacent on the inner side in the axial direction when viewed from the rotational direction. Further, in the facing area 26A, 27A, the outflow portion F2 of the slit 31, 32 located at the outermost end in the axial direction overlaps the inflow portion F1 of the slit 31, 32 adjacent on the inner side in the axial direction. Subsequently, of several slits 31, 32 formed on the outer sides in the axial direction of the facing area 26A, 27A, a pair of adjacent slits 32 are inclined so that the outer outflow portion F2 overlaps the inner inflow portion F1 (see FIG. 11 and FIG. 12).

It is noted that "overlapping" of the outflow portion F2 and the inflow portion F1 of the adjacent slits 31 to 34 when viewed from the rotational direction of the fixing belt 20 includes, but is not limited to, overlapping so that the outflow portion F2 and inflow portion F1 are completely aligned, and includes, for example, partly overlapping of the widths of the slits 31-34. In addition, since the inclination angle of the plurality of slits 31 to 34 gradually decreases from both outer sides to the center in the axial direction, the overlap width between the outflow portion F2 and the inflow portion F1 of adjacent slits 31 to 34 also gradually decreases from both outer sides to the center in the axial direction (see FIG. 11 and FIG. 12). In a middle portion of the facing area 26A, 27A, which is the facing area 26A, 27A other than the vicinities of both outer ends in the axial direction, the outflow portion F2 and the inflow portion F1 of adjacent slits 31, 32 do not overlap each other when viewed from the rotational direction (see FIG. 11 and FIG. 12).

[Action of Slits]

Figure 15:
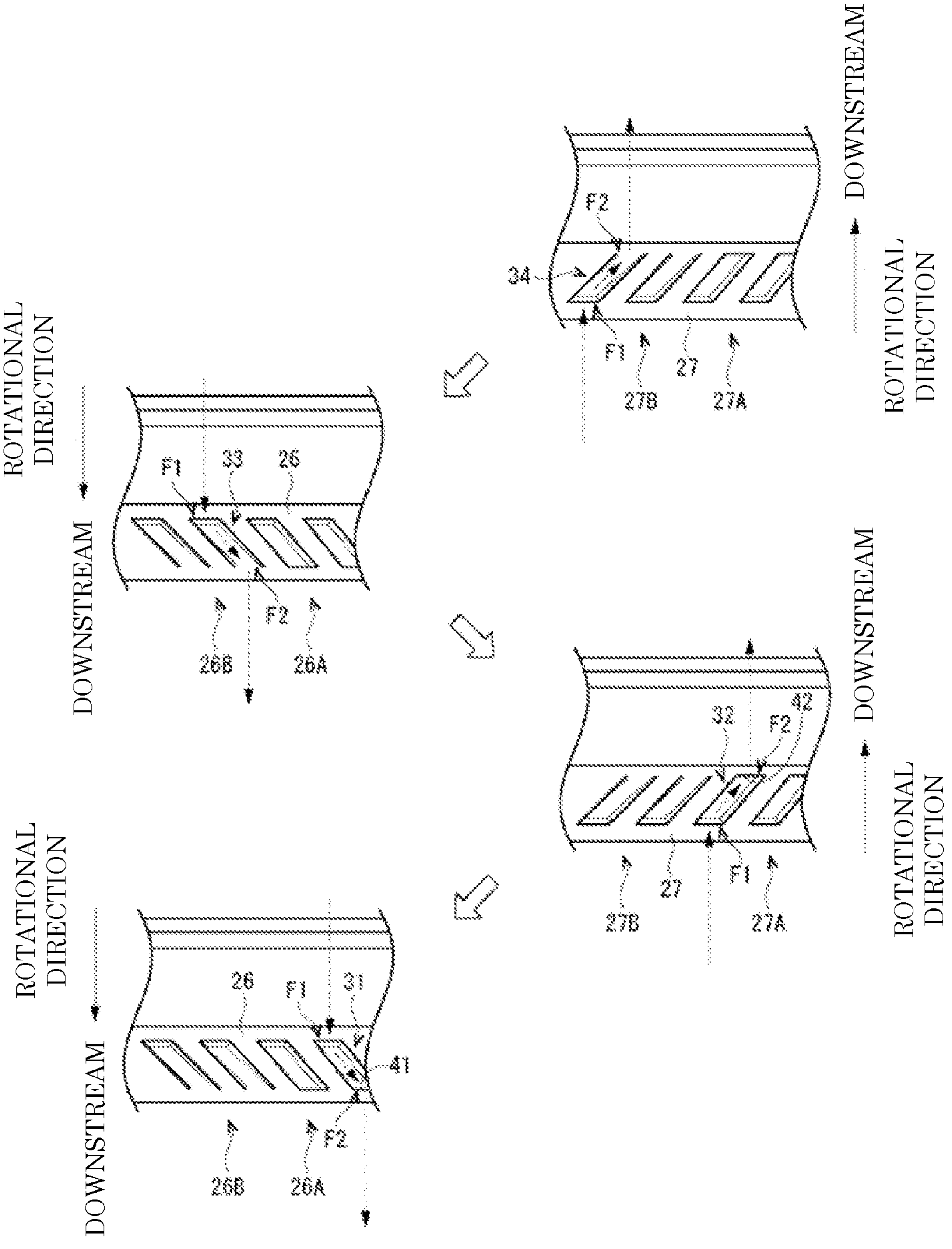
FIG. 15 is an explanatory diagram illustrating an action of slits of the fixing device according to the other modification of the first embodiment of the present disclosure.

The action of the slits 31 to 34 of the fixing device 7 according to the other modification will be described with reference to FIG. 15. FIG. 15 is an explanatory diagram illustrating the action of the slits 31 to 34.

The lubricant adhering to the inner peripheral surface 20A of the fixing belt 20 enters the slits 31 to 34 as the fixing belt 20 rotates, and moves along the slits 31 to 34 downstream in the rotational direction toward the center in the axial direction. Here, focusing on the second slit 34 positioned at the outermost end in the axial direction in the non-facing area 27B of the second sliding surface 27 (see the upper right figure in FIG. 15), the lubricant flows in from the inflow portion F1 of the second slit 34 and flows toward the center in the axial direction (see the broken lines in the upper right figure in FIG. 15). Since there is no blocking portion 42 corresponding to the second slit 34, the lubricant smoothly flows out from the outflow portion F2 of the second slit 34 (see the broken lines in the upper right figure in FIG. 15).

Thereafter, the lubricant is carried to the non-facing area 26B of the first sliding surface 26 as the fixing belt 20 rotates, flows in from the inflow portion F1 of the first slit 33 located on the inner side in the axial direction (second from the outermost end) in the non-facing area 26B, and flows toward the center in the axial direction (see the broken lines in the upper left figure in FIG. 15). Since there is no blocking portion 41 corresponding to the first slit 33, the lubricant smoothly flows out from the outflow portion F2 of the first slit 33 (see the broken lines shown in the upper left figure in FIG. 15).

Thereafter, the lubricant is carried to the facing area 27A of the second sliding surface 27 as the fixing belt 20 rotates, flows in from the inflow portion F1 of the second slit 32 located at the outermost end of the facing area 27A, and flows toward the center in the axial direction (see the broken lines shown in the lower right figure in FIG. 15). Since the second slit 32 is provided with the blocking portion 42, some of the lubricant flows out from the outflow portion F2 over the blocking portion 42, but the rest of the lubricant is blocked by the blocking portion 42 (see the broken lines in the lower right figure in FIG. 15).

Thereafter, as the fixing belt 20 rotates, the lubricant is guided to move toward the center in the axial direction by the slits 31 to 34 (see the lower left figure in FIG. 15). It is noted that, in the area where the inner peripheral surface 20A of the fixing belt 20 is not in contact with the sliding surface 26, 27, the lubricant tends to move toward both outer sides in the axial direction; therefore, not all of the lubricant moves inward in the axial direction, and some of the lubricant moves outward in the axial direction. In other words, the lubricant is not depleted on both outer sides in the axial direction.

In the fixing device 7 according to the other modification of the first embodiment described above, the blocking portions 41, 42 are formed only in the facing area 26A, 27A, and the outflow portion F2 and the inflow portion F1 of adjacent slits 31 to 34 on both outer side areas in the axial direction including the facing area 26A, 27A overlap each other. According to this configuration, the lubricant can be efficiently brought toward the center in the axial direction as the fixing belt 20 rotates, and leakage of the lubricant from the outer ends in the axial direction can be effectively suppressed.

It is noted that, in FIG. 11 and FIG. 12, some slits 31, 32 in the facing area 26A, 27A are inclined so that the outflow portions F2 overlap the inflow portions F1, but the present disclosure is not limited to this. It is sufficient that at least the slits 33, 34 formed in the non-facing areas 26B, 27B and the slits 31, 32 formed at the outermost ends in the axial direction in the facing area 26A, 27A are inclined so that each outflow portion F2 overlaps the inflow portion F1 of the other slit 31 to 34 adjacent on the inner side in the axial direction when viewed from the rotational direction of the fixing belt 20. In addition, the features of the fixing device 7 according to the other modification may be applied to the fixing device 7 (see FIG. 4 and FIG. 5) according to the first embodiment except for its modification, in which case, all of the slits 31 to 34 may be inclined so that the outflow portions F2 overlap the inflow portions F1 (not shown).

In addition, the features of the fixing device 7 according to the other modification may be applied to the fixing device 8 (see FIG. 6 to FIG. 8) according to the second embodiment (not shown). That is, a plurality of first slits 33 are formed in the first sliding surface 26, a plurality of second slits 34 are formed in the second sliding surface 27, the blocking portion 43, 44 protrudes only in the facing area 26A, 27A of the sliding surface 26, 27, and the blocking portion 43, 44 do not protrude (is not provided) in the non-facing areas 26B, 27B. In other words, it is sufficient that the blocking portion 43, 44 is provided in a protruding manner at a position where it does not prevent the lubricant from flowing out of the slits 33, 34 formed in the non-facing areas 26B, 27B.

Figure 16:
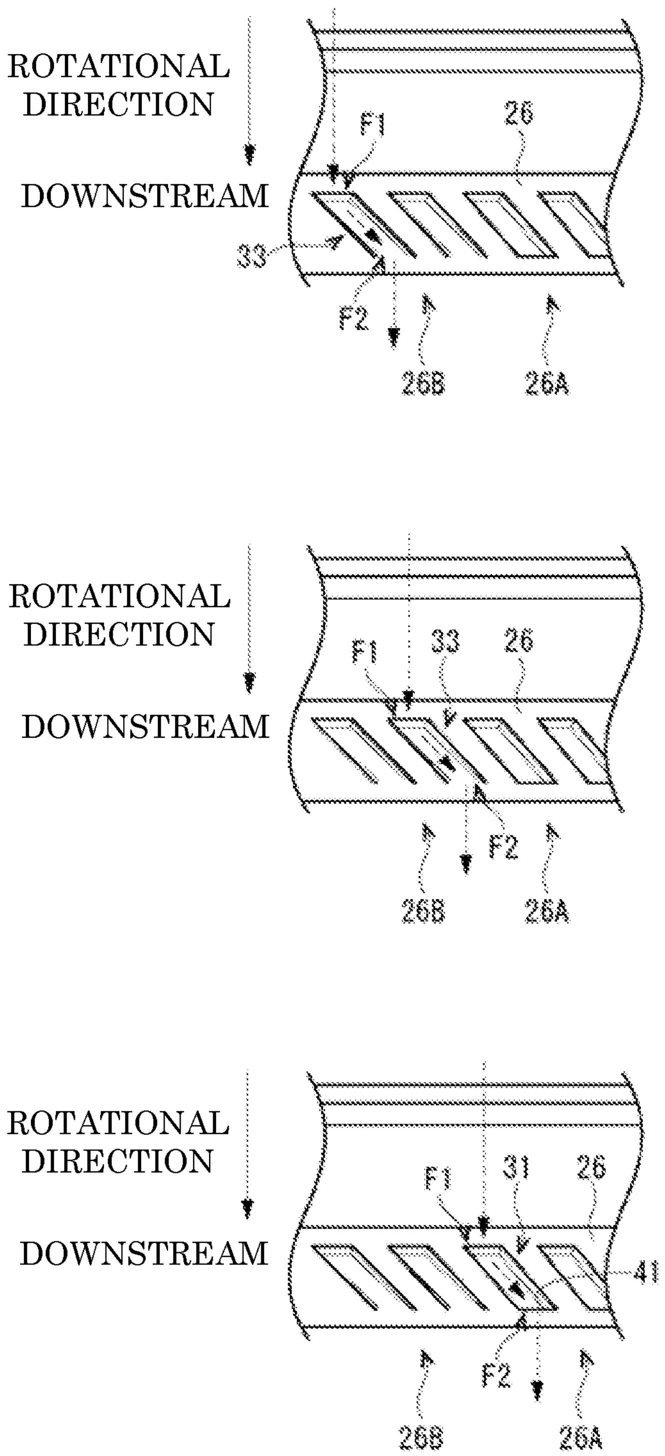
FIG. 16 is an explanatory diagram illustrating another action of the slits of the fixing device according to the other modification of the first embodiment of the present disclosure.

In addition, in the fixing devices 7 and 8 according to the other modification, the second slit 32, 34 (the blocking portion 42, 44) may be omitted (not shown). When the second slit 32, 34 is not formed in the second sliding surface 27, focusing on the first slit 33 located at the outermost end in the axial direction in the non-facing area 26B of the first sliding surface 26, the lubricant flows toward the center in the axial direction along the first slit 33 and flows out from the outflow portion F2 (see the upper figure in FIG. 16). When the fixing belt 20 rotates once, the lubricant is again carried to the non-facing area 26B of the first sliding surface 26, flows in from the inflow portion F1 of the first slit 33 located on the inner side in the axial direction in the non-facing area 26B, and flows out from the outflow portion F2 (see the middle figure in FIG. 16). Further, when the fixing belt 20 rotates once, the lubricant is carried to the facing area 26A of the first sliding surface 26, and flows in from the inflow portion F1 of the first slit 31 located at the outermost end in the facing area 26A, and some of the lubricant flows out from the outflow portion F2 over the blocking portion 41 (see the lower figure in FIG. 16). Thereafter, as the fixing belt 20 rotates, the lubricant is guided by the first slits 31 and moves toward the center in the axial direction.

It is noted that, in the fixing devices 7, 8 according to the first and second embodiments (including their modifications; the same applies hereinafter), the intervals and widths of the slits 31 to 34 in the axial direction are substantially the same, but the present disclosure is not limited to this. For example, the intervals of the slits 31 to 34 may be narrower or the widths of the slits 31 to 34 may be wider near the ends than near the center in the axial direction (not shown).

It is noted that, in the fixing devices 7, 8 according to the first and second embodiments, the blocking portions 41 to 44 are provided on both of the upstream and downstream sliding surfaces 26, 27, but the present disclosure is not limited to this. If we focus on preventing waving of the fixing belt 20, it is sufficient that blocking portions 41, 43 are provided at least on the upstream first sliding surface 26. For example, in the fixing device 7 according to the first embodiment, instead of the second slit 32, the second slit 34 of the fixing device 8 according to the second embodiment may be formed in the second sliding surface 27 (not shown).

In addition, for example, the slit 31, 32 and the blocking portion 41, 42 of the fixing device 7 according to the first embodiment may be provided in the first sliding surface 26 (or the second sliding surface 27), and the slit 33, 34 and the blocking portion 43, 44 of the fixing device 8 according to the second embodiment may be provided in the second sliding surface 27 (or the first sliding surface 26) (not shown).

In addition, in the fixing devices 7, 8 according to the first and second embodiments, the slits 31 to 34 are formed linearly, but the present disclosure is not limited to this, and the slits 31 to 34 may be curved (not shown). In addition, the slits 31 to 34 are inclined, but the present disclosure is not limited to this, and the slits 31 to 34 may be formed so as to be parallel to the rotational direction of the fixing belt 20 (or the passing direction of the sheet P) (not shown).

In addition, in the description of the above embodiments, the case where the present disclosure is applied to the monochrome image forming apparatus 1 is shown as an example, but the present disclosure is not limited to this, and may be applied to, for example, a color printer, a copier, a facsimile, a multifunction peripheral, or the like.

It is noted that the description of the above-described embodiments shows one aspect of the fixing device and the image forming apparatus according to the present disclosure, and the technical scope of the present disclosure is not limited to the above-described embodiments. The present disclosure may be changed, substituted, or modified in various ways without departing from the spirit of the technical idea, and the claims include all embodiments that may be included within the scope of the technical idea.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A fixing device comprising:

a fixing belt formed in a flexible cylindrical shape and configured to heat a toner image on a medium while rotating around an axis;

a pressure member configured to form a pressure area between the pressure member and the fixing belt while rotating around an axis, and pressurize toner on the medium passing through the pressure area; and a holder provided inside the fixing belt, having a sliding surface in contact with an inner peripheral surface of the fixing belt via a lubricant, and holding a heater for heating the fixing belt, wherein the holder includes:

a plurality of slits arranged in an axial direction on the sliding surface upstream of the pressure area in a passing direction of the medium and configured to guide movement of the lubricant from upstream to downstream in a rotational direction of the fixing belt; and a blocking portion configured to restrict an outflow of the lubricant from each of the slits and restrict a fall of the fixing belt into each of the slits, each of the slits has a bottom surface and a peripheral wall surface, and is recessed to form an annular opening edge on the sliding surface, and the blocking portion includes a wall surface of the peripheral wall surface of each of the slits, the wall surface being located downstream in the rotational direction of the fixing belt.

2. The fixing device according to claim 1, wherein the blocking portion includes a rib protruding from the sliding surface of the holder downstream of the plurality of slits in the rotational direction of the fixing belt.

3. The fixing device according to claim 1, wherein each of the slits is inclined toward a center in the axial direction from upstream to downstream in the rotational direction of the fixing belt.

4. The fixing device according to claim 1, wherein each of the plurality of slits is inclined toward a center in the axial direction from upstream to downstream in the rotational direction of the fixing belt, except for at least one of the slits which extends in parallel with the rotational direction of the fixing belt near the center in the axial direction, and an inclination angle of the plurality of slits gradually increases from the center to both outer sides in the axial direction.

5. The fixing device according to claim 3, wherein the slit includes an inflow portion that allows the lubricant to flow in from upstream in the rotational direction of the fixing belt and an outflow portion that allows the lubricant to flow out downstream in the rotational direction of the fixing belt, the sliding surface includes a facing area configured to face the medium with the fixing belt interposed therebetween, and a pair of non-facing areas on both outer sides of the facing area in the axial direction and configured not to face the medium with the fixing belt interposed therebetween, the blocking portion is formed only in the facing area, a plurality of the slits are formed in the facing area, and at least one of the slits is formed in each of the non-facing areas, and at least the slits formed in the non-facing areas and the slit formed at an outermost end in the axial direction in the facing area are each inclined so that the outflow portion of one of the slits overlaps the inflow portion of another one of the slits that is adjacent on an inner side in the axial direction when viewed from the rotational direction of the fixing belt.

6. An image forming apparatus comprising the fixing device according to claim 1.

7. A fixing device comprising:

a fixing belt formed in a flexible cylindrical shape and configured to heat a toner image on a medium while rotating around an axis;

a pressure member configured to form a pressure area between the pressure member and the fixing belt while rotating around an axis, and pressurize toner on the medium passing through the pressure area; and a holder provided inside the fixing belt, having a sliding surface in contact with an inner peripheral surface of the fixing belt via a lubricant, and holding a heater for heating the fixing belt, wherein the holder includes:

a plurality of slits arranged in an axial direction on the sliding surface upstream of the pressure area in a passing direction of the medium and configured to guide movement of the lubricant from upstream to downstream in a rotational direction of the fixing belt; and a blocking portion configured to restrict an outflow of the lubricant from each of the slits and restrict a fall of the fixing belt into each of the slits, each of the plurality of slits is inclined toward a center in the axial direction from upstream to downstream in the rotational direction of the fixing belt, except for at least one of the slits which extends in parallel with the rotational direction of the fixing belt near the center in the axial direction, and an inclination angle of the plurality of slits gradually increases from the center to both outer sides in the axial direction.

8. An image forming apparatus comprising the fixing device according to claim 7.

9. A fixing device comprising:

a fixing belt formed in a flexible cylindrical shape and configured to heat a toner image on a medium while rotating around an axis;

a pressure member configured to form a pressure area between the pressure member and the fixing belt while rotating around an axis, and pressurize toner on the medium passing through the pressure area; and a holder provided inside the fixing belt, having a sliding surface in contact with an inner peripheral surface of the fixing belt via a lubricant, and holding a heater for heating the fixing belt, wherein the holder includes:

a plurality of slits arranged in an axial direction on the sliding surface upstream of the pressure area in a passing direction of the medium and configured to guide movement of the lubricant from upstream to downstream in a rotational direction of the fixing belt; and a blocking portion configured to restrict an outflow of the lubricant from each of the slits and restrict a fall of the fixing belt into each of the slits, each of the slits is inclined toward a center in the axial direction from upstream to downstream in the rotational direction of the fixing belt, each of the slits includes an inflow portion that allows the lubricant to flow in from upstream in the rotational direction of the fixing belt and an outflow portion that allows the lubricant to flow out downstream in the rotational direction of the fixing belt, the sliding surface includes a facing area configured to face the medium with the fixing belt interposed therebetween, and a pair of non-facing areas on both outer sides of the facing area in the axial direction and configured not to face the medium with the fixing belt interposed therebetween, the blocking portion is formed only in the facing area, a plurality of the slits are formed in the facing area, and at least one of the slits is formed in each of the non-facing areas, and the at least one slit formed in the non-facing areas and the slit formed at an outermost end in the axial direction in the facing area are each inclined so that the outflow portion of one of the slits overlaps the inflow portion of another one of the slits that is adjacent on an inner side in the axial direction when viewed from the rotational direction of the fixing belt.

10. An image forming apparatus comprising the fixing device according to claim 9.

* * * * *